J. A. AMOS.
GENERATOR DISCONNECTOR BOX.
APPLICATION FILED JUNE 27, 1918.
1,359,143. Patented Nov. 16, 1920.
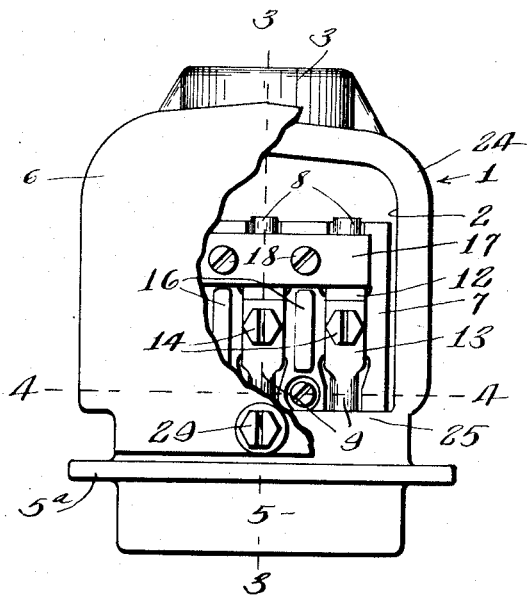
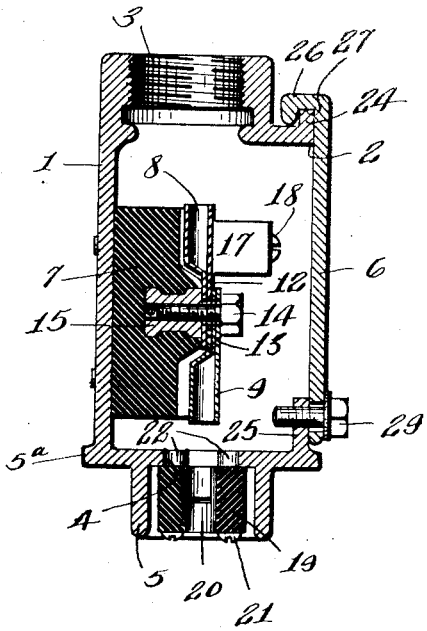
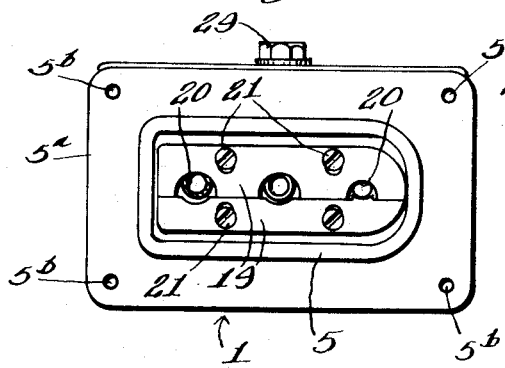
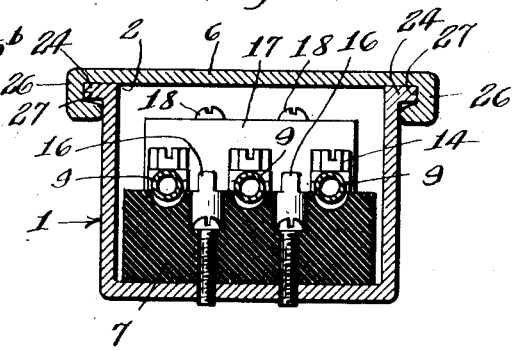
INVENTOR
John A. Amos.
BY
Parsons & Bodell
ATTORNEYS.

UNITED STATES PATENT OFFICE.

JOHN A. AMOS, OF CHICAGO, ILLINOIS, ASSIGNOR TO CROUSE-HINDS COMPANY, OF SYRACUSE, NEW YORK, A CORPORATION OF NEW YORK.

GENERATOR DISCONNECTOR-BOX.

1,359,143.   Specification of Letters Patent.   Patented Nov. 16, 1920.

Application filed June 27, 1918. Serial No. 242,168.

*To all whom it may concern:*

Be it known that I, JOHN A. AMOS, a citizen of the United States, and a resident of Chicago, in the county of Cook and State of Illinois, have invented a certain new and useful Generator Disconnector-Box, of which the following is a specification.

This invention relates to conduit outlet boxes and particularly to what for convenience is called a generator disconnector for use on railway cars in which the lights and other electrical appliances of the car are supplied from a generator on the trucks; and the invention has for its object a particularly simple and durable construction by which the wires leading from the generator can be readily disconnected from the wires leading into the car.

The invention consists in the novel features and in the combinations and constructions hereinafter set forth and claimed.

In describing this invention, reference is had to the accompanying drawings in which like characters designate corresponding parts in all the views.

Figure 1 is a plan view, partly broken away, of this disconnector box.

Fig. 2 is an end elevation of this box looking upwardly in Fig. 1.

Figs. 3 and 4 are sectional views taken, respectively, on lines 3—3, and 4—4, Fig. 1.

This box as will be understood by those skilled in the art, is usually mounted upon a girder of the car body and is connected to the electrical conduit inclosing the wires leading from the terminals in the box to the lights and other electrical appliances within the car.

This generator disconnector comprises a box including a body 1 having an open front side 2, wire openings in other walls, and a cover for the open side of the body, and a disconnector block having a pair of terminals facing the wire holes respectively, means common to the terminals for securing the terminals to the block, and additional means for securing one terminal to the block, when the securing means, common to both is removed to release the other terminal. As here shown, the body is formed with means as an internally threaded nipple 3 for connection to the electrical conduit associated with the car body and an opening 4 at its other or lower end for the service wires leading from the generator mounted on the trucks. The body is also provided with an external shield or housing 5 in the form of a continuous flange around the opening 4 and with an external flange 5ª having openings 5ᵇ, the flange 5ª resting on a suitable base through which the shield 5 extends and to which the flange 5ª is secured as by bolts extending through the openings 5ᵇ.

6 designates the cover for the open side 2.

7 is the insulating base, the base being mounted on the bottom of the body opposite the open side 2 and having terminals 8, 9, facing the nipple 3 and wire opening at opposite ends of the box.

These terminals are arranged in pairs and the terminals 8, 9, of each pair are electrically and mechanically connected and are also mechanically secured to the block 7 by means common to the terminals of each pair. As here shown, the terminals are in the form of sockets which receive the ends of the wires and in which the wires are permanently secured and these sockets have flattened stem portions 12, 13, the stem portions of the terminals 9, which are connected to the wires coming from the generator or battery through wire openings 4, overlapping the stems of the other terminal 8; and clamping means as a screw 14 extends through the lapping portions of the stems of each pair of terminals and threads into the block of insulation, it being here shown as threading into a metal block 15 embedded in the base 7. There are three pairs of terminals and the pairs are separated by barriers 16. The terminals 8 which are located on one side of the base and face, the passage of the nipple 3, are held in clamped position by additional means as a block 17 common to all the terminals 8 and screws 18 passing through the block 17 and into the base between the terminals 8.

The opening 4 is provided with a closure or entrance piece 19 having passages 20 alined with the sockets of the terminals 9 on the opposing end of the base 7, this entrance piece being located within the flange or shield 5. It is held in position by means of screws 21 extending through the block and threading into the lugs 22 projecting at intervals into the opening 4. The closure or entrance piece 19 is here shown as formed of opposing sections and the openings 20 are formed between these sections. The closure 19 and shield 5 are so shaped that the closure can be inserted therein in one position only in order to insure the bringing of the wires passing through the block into connection with terminals 9 of the same polarity when the wires and closure 19 are being replaced. As here illustrated, the closure 19 and shield 5 are formed rounding at like ends and square at the other ends.

The open side of the box is formed with an external marginal flange 24 around three sides of the opening and with an internal flange 25 on the fourth side; and the cover is formed with a marginal flange 26 on three sides thereof shaped to form an inwardly facing channel 27 which channel is complemental to the flange 24, the fourth side of the cover is provided with the flange 26 and laps the internal flange 25.

In operation, the cover slides edgewisely onto the box, the flange 24 entering the channel 27 during the endwise movement, and the cover is held in position by a fastening member 29 passing through a margin of the cover 6 provided with a flange 26 and into the internal flange 25 of the body.

In use, the box is mounted on the girder of the car and is connected to the conduit threading into the nipple 3. The wires leading to the car have their ends located in the terminals 8 on the side of the base 7 facing the nipple 3, and those leading from the generator through the entrance piece 19 have their ends clamped in the sockets 9 on the opposite or lower side of the block. When it is necessary to disconnect the wires leading from the generator, from those associated with the car body as when the trucks are to be removed from the car, the cover 6 is first removed, the clamping screws 14 are then removed and the screws 21 unscrewed to permit the closure 19 to remain on the service wires to which the terminals 9 are secured. The sockets 8 are held in position by the additional clamping means 17.

This disconnector is particularly advantageous in that it consists of but a few, simple parts, and further in that owing to the connections between the terminals, and to the single screw for each pair of terminals, the wires leading from the generator are readily connected to and disconnected from the plugs 15, without disturbing the connection between the terminals 8 and the wires passing through the nipple 3.

What I claim is:

A disconnector having a base of insulation, two sets of terminals mounted on the base and facing in different directions, the terminals of the sets being grouped in pairs, clamping means common to the terminals of each pair for holding the terminals from detachment, and additional means common to a plurality of the terminals of one set for holding them in position when the clamping means is loosened to disengage the terminal or terminals of the other set, substantially as and for the purpose described.

In testimony whereof, I have hereunto signed my name, at Chicago, in the county of Cook, and State of Illinois, this 20th day of June, 1918.

JOHN A. AMOS.